(12) United States Patent
Song et al.

(10) Patent No.: US 10,924,800 B2
(45) Date of Patent: Feb. 16, 2021

(54) COMPUTERIZED SYSTEM AND METHOD FOR AUTOMATICALLY DETECTING AND RENDERING HIGHLIGHTS FROM STREAMING VIDEOS

(71) Applicant: VERIZON MEDIA INC., New York, NY (US)

(72) Inventors: Yale Song, New York, NY (US); Jordi Vallmitjana, New York, NY (US)

(73) Assignee: VERIZON MEDIA INC., New York, NY (US)

( * ) Notice: Subject to any disclaimer, the term of this patent is extended or adjusted under 35 U.S.C. 154(b) by 0 days.

(21) Appl. No.: 16/543,852

(22) Filed: Aug. 19, 2019

(65) Prior Publication Data

US 2019/0373315 A1 Dec. 5, 2019

Related U.S. Application Data

(63) Continuation of application No. 15/088,792, filed on Apr. 1, 2016, now Pat. No. 10,390,082.

(51) Int. Cl.
*H04N 21/44* (2011.01)
*G06K 9/00* (2006.01)
(Continued)

(52) U.S. Cl.
CPC ... *H04N 21/44008* (2013.01); *G06K 9/00718* (2013.01); *H04N 21/2187* (2013.01);
(Continued)

(58) Field of Classification Search
CPC ......... H04N 21/44008; H04N 21/2187; H04N 21/4666; H04N 21/812; H04N 21/8456;
(Continued)

(56) References Cited

U.S. PATENT DOCUMENTS 8,310,597 B2 11/2012 Suh
8,457,469 B2 6/2013 Suzuki
(Continued)

FOREIGN PATENT DOCUMENTS

CN 101877060 A 11/2010
WO 2013126589 A1 8/2013

OTHER PUBLICATIONS

International Search Report and Written Opinion to corresponding International Application No. PCT/US2017/019879 dated Jun. 9, 2017 (8 pages).
(Continued)

*Primary Examiner* — Alexander Gee
(74) *Attorney, Agent, or Firm* — James J. DeCarlo; Greenberg Traurig, LLP

(57) ABSTRACT

Disclosed are systems and methods for improving interactions with and between computers in content generating, searching, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatically detecting and rendering highlights from streaming videos in real-time. As a streaming video is being broadcast over the Internet, the disclosed systems and methods determine each type of scene from the streaming video, and automatically score highlight scenes. The scored highlight scenes are then communicated to users as compiled video segments, which can be over any type of channel or platform accessible to a user's device and network that enables content rendering and user interaction.

19 Claims, 9 Drawing Sheets

(51) Int. Cl.
 *H04N 21/234* (2011.01)
 *H04N 21/25* (2011.01)
 *H04N 21/8549* (2011.01)
 *H04N 21/2187* (2011.01)
 *H04N 21/845* (2011.01)
 *H04N 21/466* (2011.01)
 *H04N 21/81* (2011.01)

(52) U.S. Cl.
 CPC ..... *H04N 21/23418* (2013.01); *H04N 21/251* (2013.01); *H04N 21/4666* (2013.01); *H04N 21/812* (2013.01); *H04N 21/8456* (2013.01); *H04N 21/8549* (2013.01)

(58) Field of Classification Search
 CPC ........... H04N 21/234; H04N 21/23418; H04N 21/8549; H04N 21/845; H04H 60/37; H04H 60/56; H04H 60/59
 See application file for complete search history.

(56) References Cited

U.S. PATENT DOCUMENTS

| | | | |
|---|---|---|---|
| 2002/0097902 A1 | 7/2002 | Roehrig et al. | |
| 2004/0041831 A1 | 3/2004 | Zhang | |
| 2004/0045030 A1 | 3/2004 | Reynolds et al. | |
| 2005/0195331 A1 | 9/2005 | Sugano et al. | |
| 2010/0278419 A1* | 11/2010 | Suzuki | G06F 16/739 |
| | | | 382/155 |
| 2011/0026840 A1 | 2/2011 | Tao et al. | |
| 2012/0033933 A1 | 2/2012 | Suzuki | |
| 2013/0226983 A1 | 8/2013 | Beining et al. | |
| 2013/0237317 A1* | 9/2013 | Rychagov | H04N 5/93 |
| | | | 463/31 |
| 2014/0349750 A1 | 11/2014 | Thompson et al. | |
| 2015/0178265 A1 | 6/2015 | Anderson et al. | |
| 2015/0228309 A1 | 8/2015 | Bartlow et al. | |
| 2016/0012296 A1 | 1/2016 | Xing et al. | |
| 2016/0091965 A1* | 3/2016 | Wang | G06F 3/011 |
| | | | 345/156 |
| 2016/0112727 A1* | 4/2016 | Mate | H04N 21/2353 |
| | | | 725/32 |
| 2016/0150288 A1* | 5/2016 | Wilson | H04N 21/812 |
| | | | 725/34 |
| 2016/0180195 A1 | 6/2016 | Martinson et al. | |
| 2016/0247534 A1* | 8/2016 | Pan | G11B 27/322 |
| 2016/0292510 A1* | 10/2016 | Han | G11B 27/06 |
| 2016/0353139 A1* | 12/2016 | Smith | H04N 21/8456 |
| 2016/0378863 A1 | 12/2016 | Shlens et al. | |
| 2017/0109584 A1* | 4/2017 | Yao | H04N 21/4666 |
| 2017/0180819 A1* | 6/2017 | Quan | H04N 21/4334 |
| 2017/0235828 A1 | 8/2017 | Philipose et al. | |

OTHER PUBLICATIONS

International Preliminary Report on Patentability to corresponding International Application No. PCT/US2017/019879 dated Oct. 11, 2018 (6 pages).

Extended European Search Report to corresponding EP Application No. 17776181.4 dated Aug. 7, 2019 (8 pages).

* cited by examiner

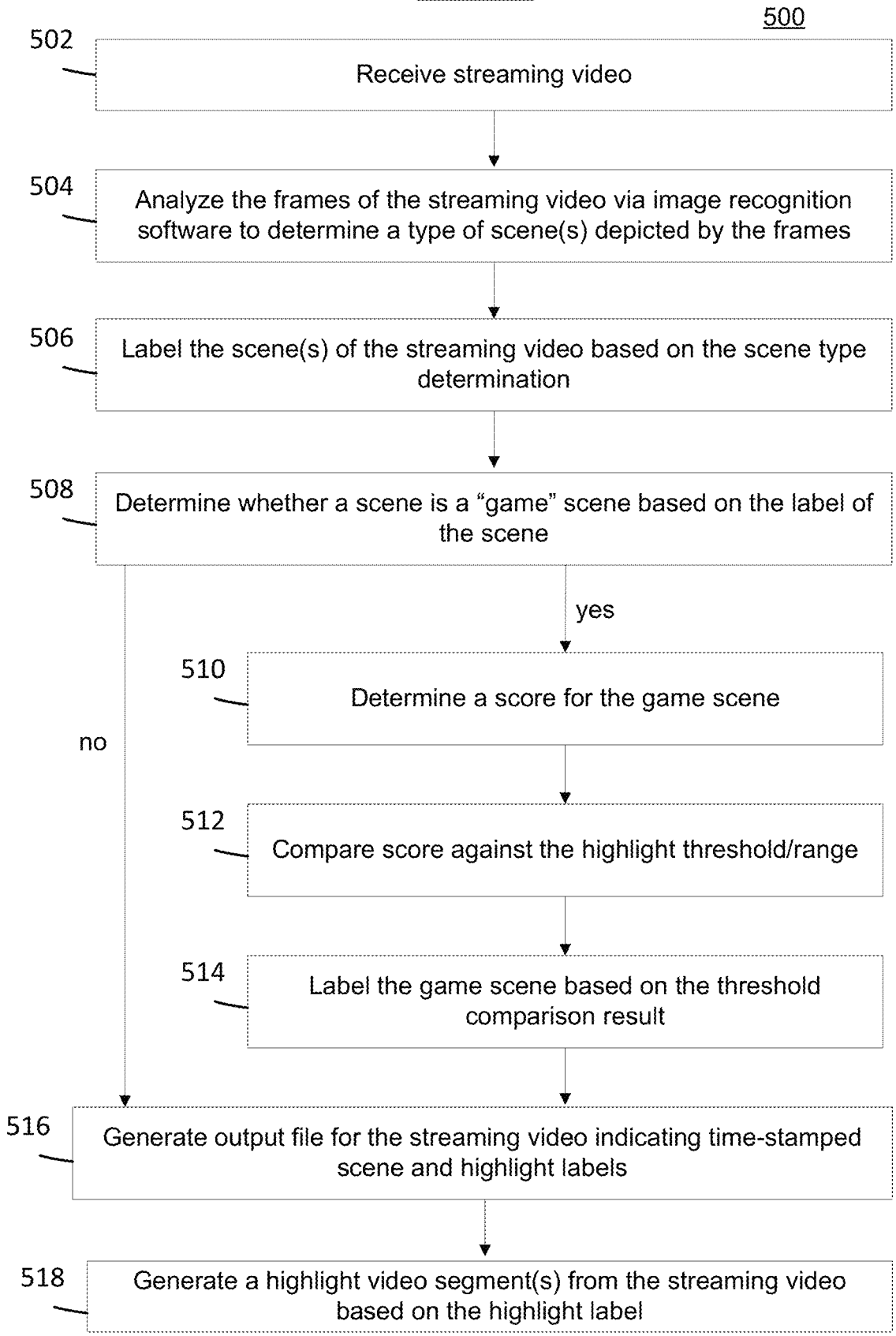

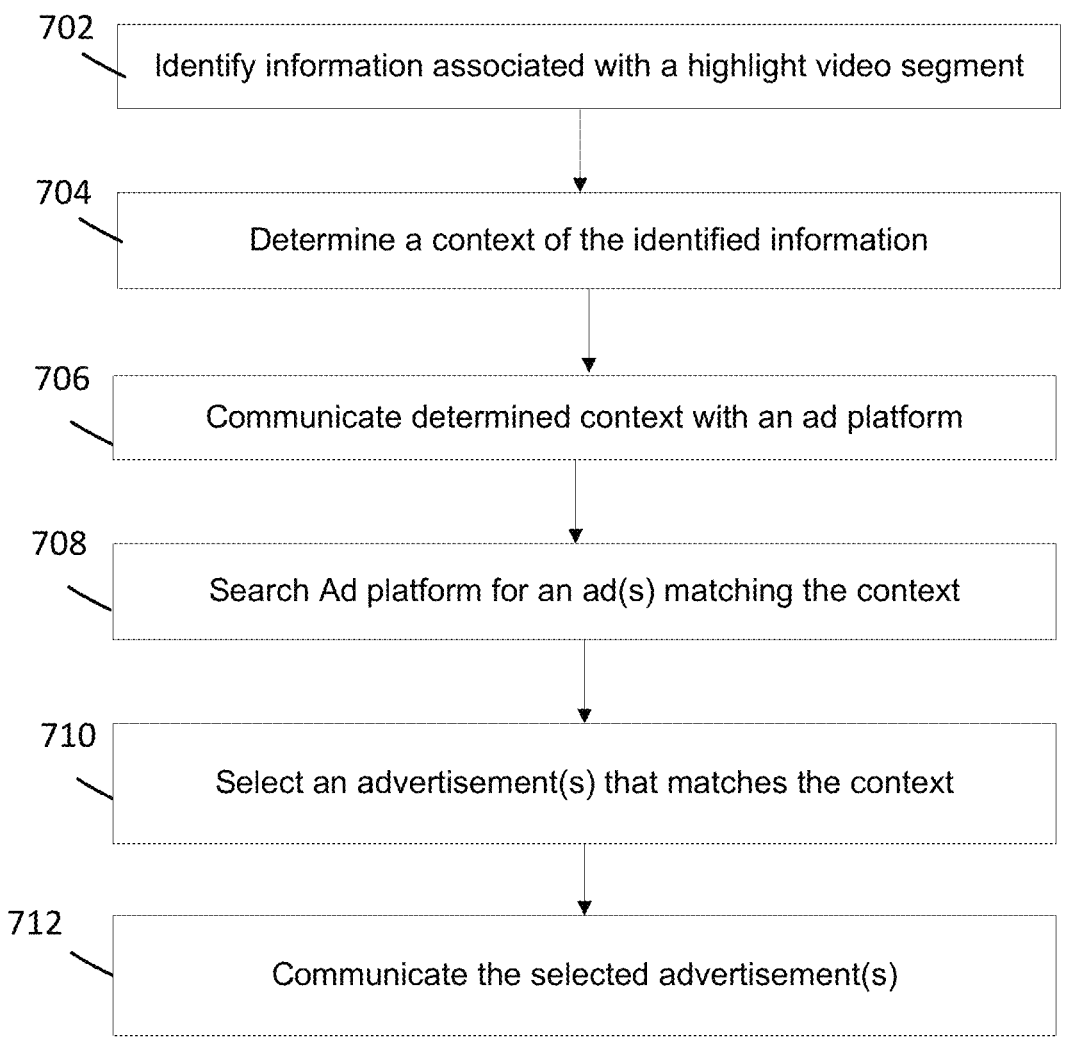

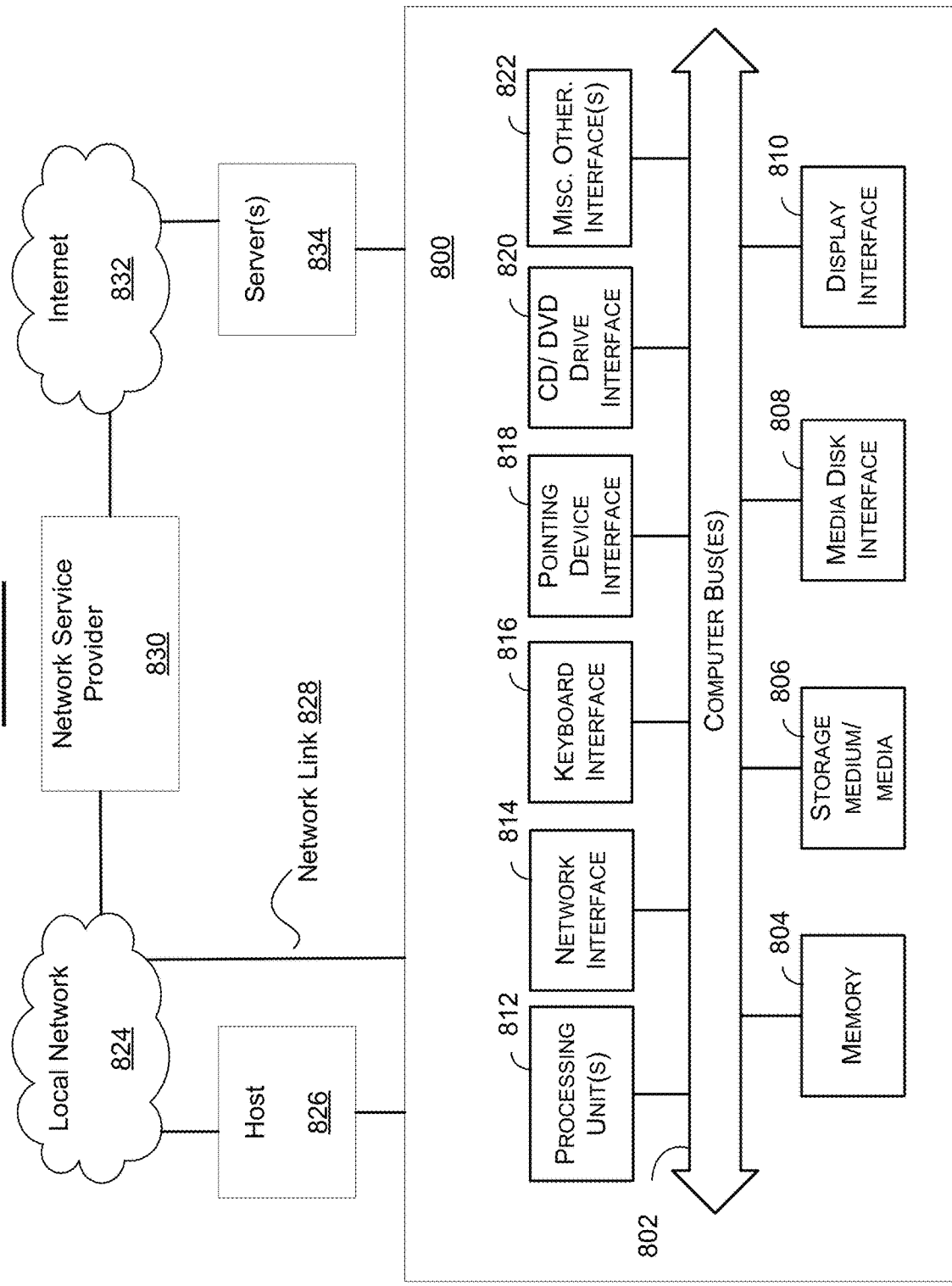

COMPUTERIZED SYSTEM AND METHOD FOR AUTOMATICALLY DETECTING AND RENDERING HIGHLIGHTS FROM STREAMING VIDEOS

CROSS REFERENCE TO RELATED APPLICATIONS

This application is a continuation of and claims priority from co-pending U.S. patent application Ser. No. 15/088,792, filed Apr. 1, 2016, entitled COMPUTERIZED SYSTEM AND METHOD FOR AUTOMATICALLY DETECTING AND RENDERING HIGHLIGHTS FROM STREAMING VIDEOS, the contents of which is hereby incorporated by reference.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content generating, searching, providing and/or hosting computer systems and/or platforms by modifying the capabilities and providing non-native functionality to such systems and/or platforms for automatically detecting and rendering highlights from streaming game videos in real-time.

SUMMARY

The present disclosure provides novel systems and methods for automatic, real-time identification and creation of video clips from streaming video. According to some embodiments, the disclosed systems and methods employ a novel cascade prediction model, referred to, for purposes of this disclosure, as a scene-highlight classifier having a scene classifier sub-part and a highlight classifier sub-part. The scene classifier works by analyzing frames of streaming video (or segments) in order to determine a type of scene being received. The highlight classifier takes as input the frames classified as a "game" scene and determines a score for each sequence of frames of the game scene. According to some embodiments, the game scenes of the streaming video that satisfy a highlight threshold are identified for communication to a user or broadcast to a plurality of users over the Internet.

Currently, automatically detecting highlights from streaming video is an extremely challenging and cost-ineffective task. Conventional systems, services and platforms are unable to identify and compile (or even extract) highlights (or scenes of interest) from streaming media because they are unable to perform the necessary computational steps in real-time (e.g., without user input) while the video is being broadcast. In fact, existing systems are only able to generate highlights of video content with human editors after a game has ended (e.g., after the stream has concluded). There is no current online system or mechanism for determining and outputting "on-the-fly" segmentation of streaming media as the media arrives.

The present disclosure addresses the existing shortcomings in the art by providing automatic systems and methods that label scenes from streaming media and score those scenes classified as a "highlight" in real-time, which can then be used to generate short-form videos of game highlights and/or summaries.

In accordance with one or more embodiments, a method is disclosed for automatically analyzing online streaming media in order to automatically identify, score and create video clips (or segments) from the streaming video. The automatic creation of video clips from the streaming media occurs in real-time based on the disclosed cascaded prediction modeling that interprets the attributes of incoming streaming media and ascertains the type of the content being streamed. Based on this analysis, a short-form video file can be created that comprises only the content from the streaming media corresponding to highlights of the stream.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically detecting and rendering highlights from streaming game videos in real-time.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 5 is a flowchart illustrating steps performed in accordance with some embodiments of the present disclosure;

FIG. 7 is a flowchart illustrating steps performed in accordance with some embodiments of the present disclosure; and FIG. 8 is a block diagram illustrating the architecture of an exemplary hardware device in accordance with one or more embodiments of the present disclosure.

DESCRIPTION OF EMBODIMENTS

Figure 1:
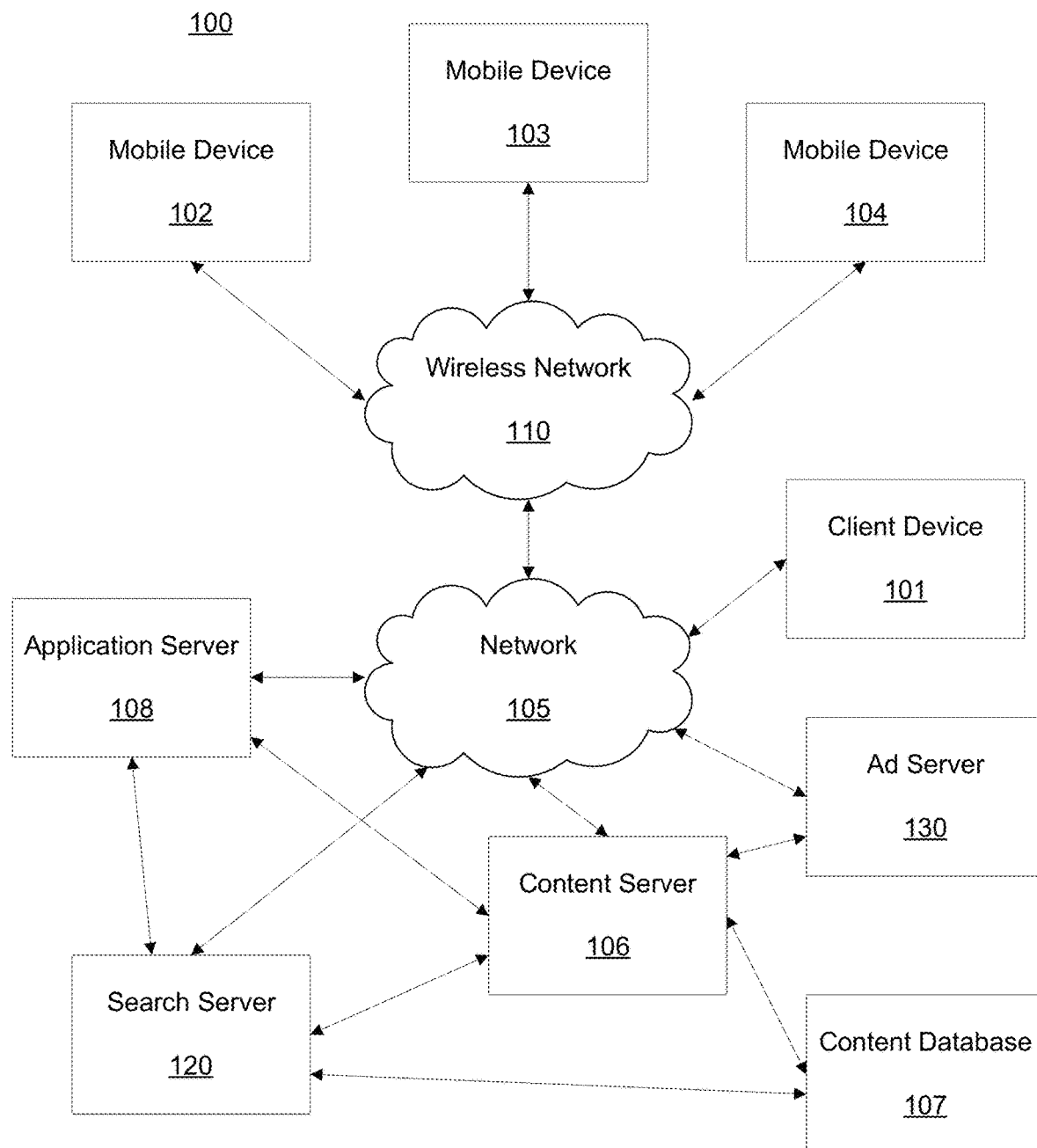
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. The present disclosure provides novel systems and methods for automatic, real-time identification and/or creation of video clips (or segments) from streaming video.

The disclosed systems and methods employ a novel cascade prediction model, referred to, as discussed above, a scene-highlight classifier. As discussed in detail below in relation to FIGS. 4A-4B, the scene-highlight classifier is trained and/or modeled based upon any known or to be known machine learning modeling technique or algorithm that leverages analyzed visual scene attributes/characteristics within a training set of video through an applied machine-in-loop video annotation system. The training of the scene-highlight classifier enables the disclosed systems and methods (e.g., the scene-highlight classifier engine 300) to discard certain parts (e.g., frames) from streaming video in order to focus on detecting highlights from the remaining frames of the streaming video.

The scene-highlight classifier comprises two layers: a scene classifier layer and a highlight classifier layer. As discussed in detail below, the scene-highlight classifier has a conditional cascade modeling infrastructure based on the premise that only particular types of scenes determined by the scene classifier are passed on to the highlight classifier layer.

As understood by those of skill in the art, streaming media comprises distinct scenes that correspond to particular types of content. Such content types include, but are not limited to, scenes where a commentator is speaking, scenes depicting game play, scenes depicting images of a game player or his/her avatar or digital likeness, scenes depicting the audience, and the like.

As discussed herein, the scene classifier analyzes incoming (and stored) frames of streaming video (or segments) in order to determine a type of scene being received within the stream. The scene classifier aims to discriminate game scenes (e.g., scenes that depict game play) from non-game scenes (e.g., scenes that comprise content associated with a commentator, game player, audience, and the like). The highlight classifier takes as input the sequence of frames classified as a "game" scene and determines a score. According to some embodiments, the game scenes of the streaming video that satisfy a highlight threshold (or fall within a range, as discussed below) are determined to be a "highlight" and identified for communication to a user or broadcast to a plurality of users over the Internet.

According to some embodiments, the highlight threshold (or range) ensures that the game scenes comprise content associated with a distinctive set of predetermined visual parameters. Such visual parameters can include, but are not limited to, a threshold satisfying amount of activity occurring during the segment, a threshold satisfying variation of pixel attributes (e.g., a purse of bright light triggered by activity in the segment), a displayed game status (e.g., an indication that an enemy has been killed or a person has scored), and the like.

Figure 6:
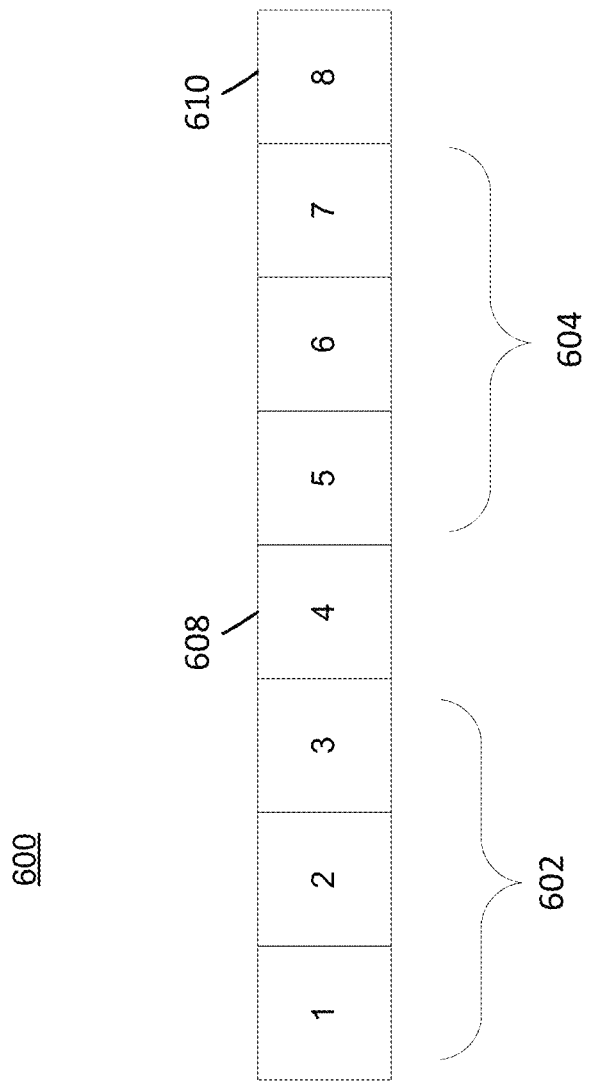
FIG. 6 is a diagram of an exemplary example of a non-limiting embodiment in accordance with some embodiments of the present disclosure.

By way of a non-limiting example, FIG. 6 illustrates a non-limiting embodiment of the instant disclosure. In the example, video stream 600 is received. The stream 600 comprises 8 frames—numbered 1-8. Frames 1-3, item 602, comprise content showing a commentator welcoming the viewers to the live broadcast. Frame 4, item 608, comprises a scene transition or shot boundary within the video stream 600, such as, for example, a cut between video frames 3 and 5, fade in/out between frames 3 and 5, dissolve or wipe effect(s), and/or any other type of known or to be known effect that transitions between scenes of a video file. Frames 5-7, item 604, comprise content showing game play—for example, live streaming footage of two players playing an online game and one player "killing" the other player. And, Frame 8, item 610, comprises content indicating the end of the stream—for example, a fade-to-black transition.

The disclosed systems and methods can analyze the incoming stream 600 in real-time in order to determine which sequence of frames (or scene) of the stream correspond to a game scene. As detailed below in relation to FIGS. 3-5, as the frames of the stream 600 are received (and/or stored in memory or a database/datastore), the scene classifier of the scene-highlight classifier analyzes the frames to determine what type of content is being relayed by each frame or sequence of frames. If the scene classifier determines that the scene(s) is related to game-play, then the scene(s) is passed to the highlight classifier, which scores the scene in order to determine whether the game play is an actual highlight.

As with the example of FIG. 6, item 602 corresponds to a scene of the commentator speaking. Item 604 corresponds to a scene of one player scoring on the other player (e.g., "killing" the other player within the construct of the game). Therefore, according to some embodiments of the present disclosure, only scene 604 is passed to the highlight classifier.

In some embodiments, the scenes 602 and 604 are labeled based on the analysis by the scene classifier. In some embodiments, such labels provide an indication as to not only the type of content depicted upon rendering of the frames of the scene, but also the length (and/or beginning and end) of the scene. In some embodiments, items 608 and 610, Frames 4 and 8 respectively, can be determined by the scene-highlight classifier implementing any known or to be known media frame analysis algorithm or scheme technique for determining differences between adjacent frames. In such embodiments, these labeled frames can serve as designators for the starting and/or stopping of particular scenes within the stream 600.

Continuing with the above example, the highlight classifier analyzes the scene and scores the content of the scene 604. For example, as discussed in more detail below, highlight classifier can execute any known or to be known type of image or content recognition model or algorithm that can identify the depicted content of each frame of scene 604 (frames 5-7) and calculate a score for the activity occurring within, during and/or between frames 5-7. Since frames 5-7 depict one player scoring over another, for example, such activity would be result in a score satisfying the highlight threshold, therefore, scene 604 would be labeled as a "highlight."

In some embodiments, as discussed in more detail below, the identified frames corresponding to the determined "highlight" scene can be extracted, identified or otherwise utilized for creation of a short-form video clip or segment. In some embodiments, such creation of a highlight video segment can involve, but not limited to, generating (or creating or extracting) a highlight video segment from the frames of the stream 600 using any known or to be known frame/segment transformation technique, such as, but not limited to, imagemagick and gifsicle libraries, to name a few examples. For example, scene 604 can be transformed into a highlight video segment that is formatted as a graphics interchange format (GIF) file. Such GIF file can then be communicated to a requesting user and/or provided on an online platform that enables users to view highlights of on-going or past game play.

The disclosed systems and methods can be implemented for any type of content item or streaming media, including, but not limited to, video, audio, images, text, and/or any other type of multimedia content. While the discussion herein will focus on streaming video and identification of video frames/segments/clips within such stream, it should not be construed as limiting, as any type of content or multimedia content, whether known or to be known, can be utilized without departing from the scope of the instant disclosure.

As discussed in more detail below at least in relation to FIG. 7, according to some embodiments, information associated with or derived from identified and/or created highlight video segments, as discussed herein, can be used for monetization purposes and targeted advertising when providing, delivering, sharing or enabling access to the streaming media and/or created highlight video segments (e.g., on Yahoo!'s eSports® platform). Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEU1, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., Yahoo! eSports®, YouTube®), a gaming site, an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, game servers, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a gaming application, a streaming video application, blog, photo storage/sharing application or social networking application, can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
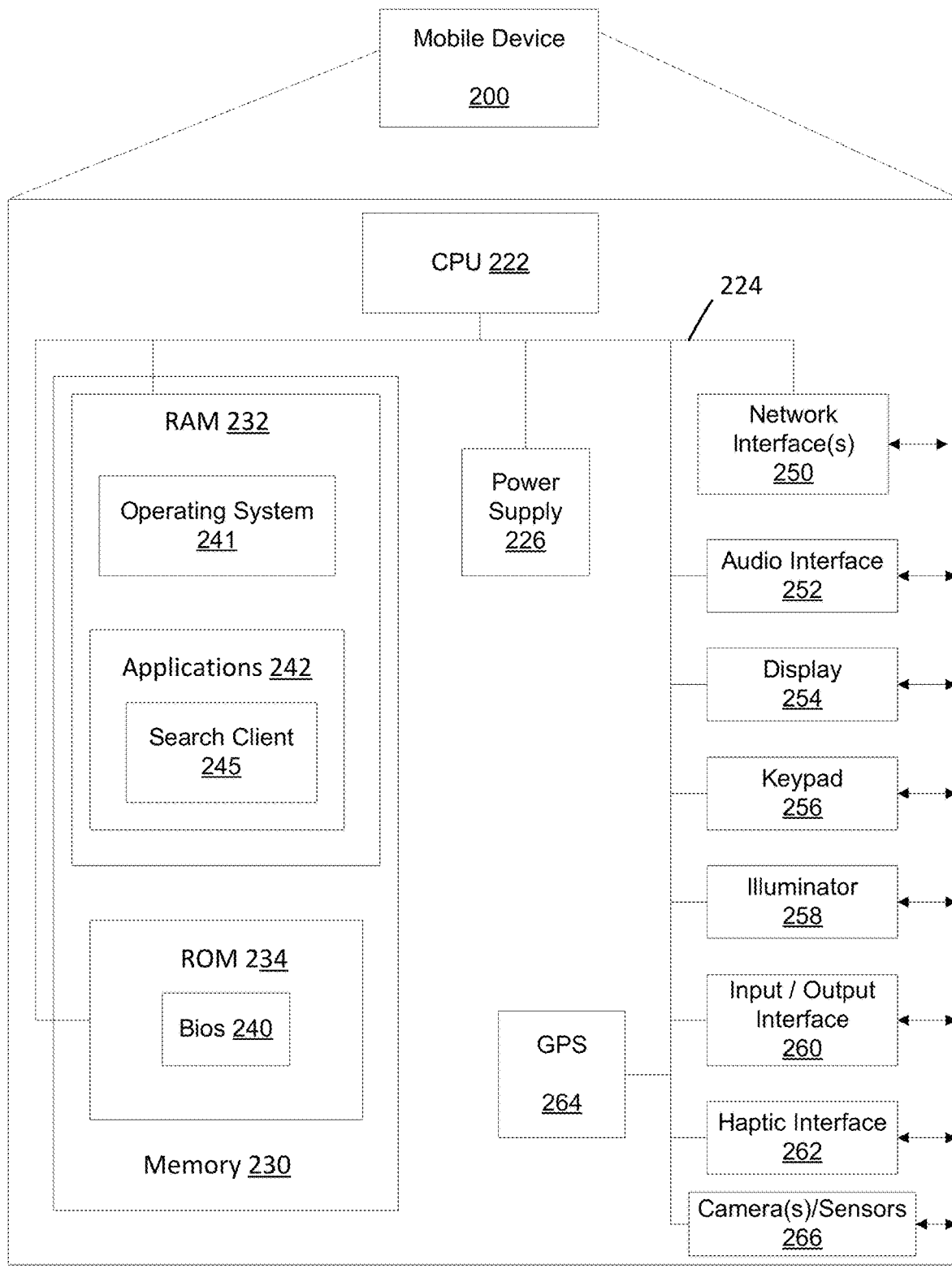
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geopositioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
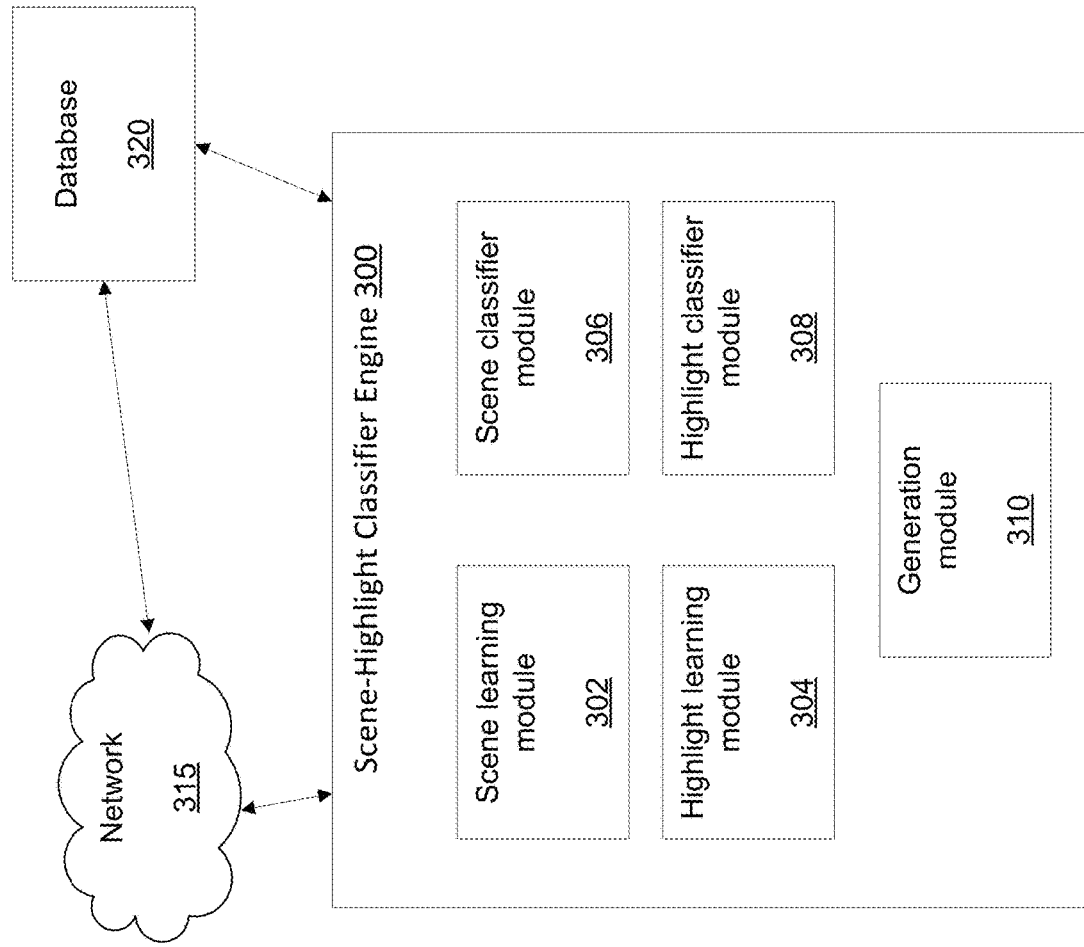
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a scene-highlight classifier engine 300, network 315 and database 320. The scene-highlight classifier engine 300 can be a special purpose machine or processor and could be hosted by an application server, game server, content server, social networking server, web server, search server, content provider, email service provider, ad server, user's computing device, and the like, or any combination thereof.

According to some embodiments, scene-highlight classifier engine 300 can be embodied as a stand-alone application that executes on a user device. In some embodiments, the scene-highlight classifier engine 300 can function as an application installed on the user's device, and in some embodiments, such application can be a web-based application accessed by the user device over a network. In some embodiments, the scene-highlight classifier engine 300 can be installed as an augmenting script, program or application to another media application (e.g., Yahoo! eSports®, Yahoo! Video®, Hulu®, and the like).

The database 320 can be any type of database or memory, and can be associated with a content server on a network (e.g., content server 106, search server 120 or application server 108 from FIG. 1) or a user's device (e.g., device 101-104 or device 200 from FIGS. 1-2). Database 320 comprises a dataset of data and metadata associated with local and/or network information related to users, services, applications, content (e.g., video) and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes creating, streaming, recommending, rendering and/or delivering videos, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with video content from an assortment of media and/or service providers and/or platforms (e.g., game content and/or game console or platform content/information). For example, the information can be related to, but not limited to, content type of the video, a category associated with the video, information associated with the pixels and frames of the videos, information associated with the provider of the video, information associated with the players involved in the video, and any other type of known or to be known attribute or feature associated with a video file. Additionally, the video information in database 320 for each video can comprise, but is not limited to, attributes including, but not limited to, popularity of the video, quality of the video, recency of the video (when it was published, shared, edited and the like), and the like. Such factors can be derived from information provided by the user, a service provider (i.e., Yahoo!® or Tumblr®), by the content/service providers providing video content (e.g., Yahoo! eSports®, ESPN®, ABC Sports®, Netflix®, Hulu®, YouTube®), or by other third party services (e.g., rottentomatoes.com, IMDB™, Facebook®, Twitter® and the like), or some combination thereof.

According to some embodiments, as such video information is received, it can be stored in database 320 as a n-dimensional vector (or feature vector) representation for each video and/or for each frame of the video, where the information associated with the video can be translated as a node on the n-dimensional vector. Database 320 can store and index video information in database 320 as linked set of video data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. While the storage discussion above involves vector analysis of streaming video and video information associated therewith, the stored video information can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

For purposes of the present disclosure, as discussed above, videos (which are stored and located in database 320) as a whole are discussed within some embodiments; however, it should not be construed to limit the applications of the systems and methods discussed herein. That is, while reference is made throughout the instant disclosure to videos (e.g., streaming and/or downloadable videos associated with live online gaming), other forms of user generated content and associated information, including for example text, audio, multimedia, RSS feed information can be used without departing from the scope of the instant application, which can thereby be communicated and/or accessed and processed by the scene-highlight classifier engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the scene-highlight classifier engine 300, and the database of stored resources 320. Indeed, as illustrated in FIG. 3, the scene-highlight classifier engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as scene-highlight classifier engine 300, and includes scene learning module 302, highlight learning module 304, scene classifier module 306, highlight classifier module 308, and generation module 310. It should be understood that the engine(s) and modules discussed herein are non-exhaustive, as additional or fewer engines and/or modules (or sub-modules) may be applicable to the embodiments of the disclosed systems and methods. The operations, configurations and functionalities of each module, and their role within embodiments of the present disclosure will be discussed with reference to FIGS. 4A-5.

As discussed in more detail below, the information processed by the scene-highlight classifier engine 300 can be supplied to the database 320 in order to ensure that the information housed in the database 320 is up-to-date as the disclosed systems and methods leverage real-time information and/or behavior associated with the received streaming video file, as discussed in more detail below.

Figure 4A:
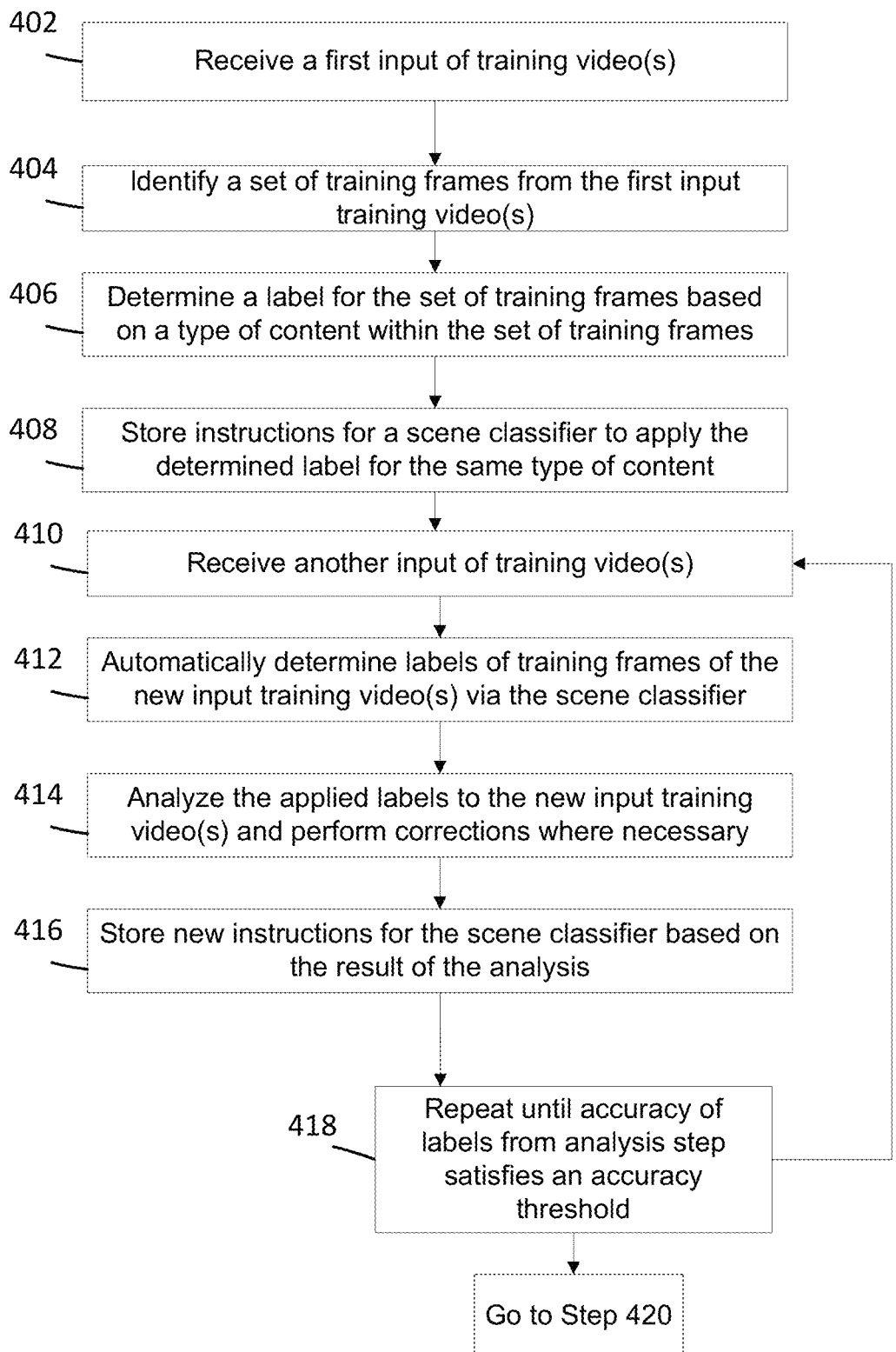
FIGS. 4A-4B are flowcharts illustrating steps performed in accordance with some embodiments of the present disclosure.
Figure 4B:
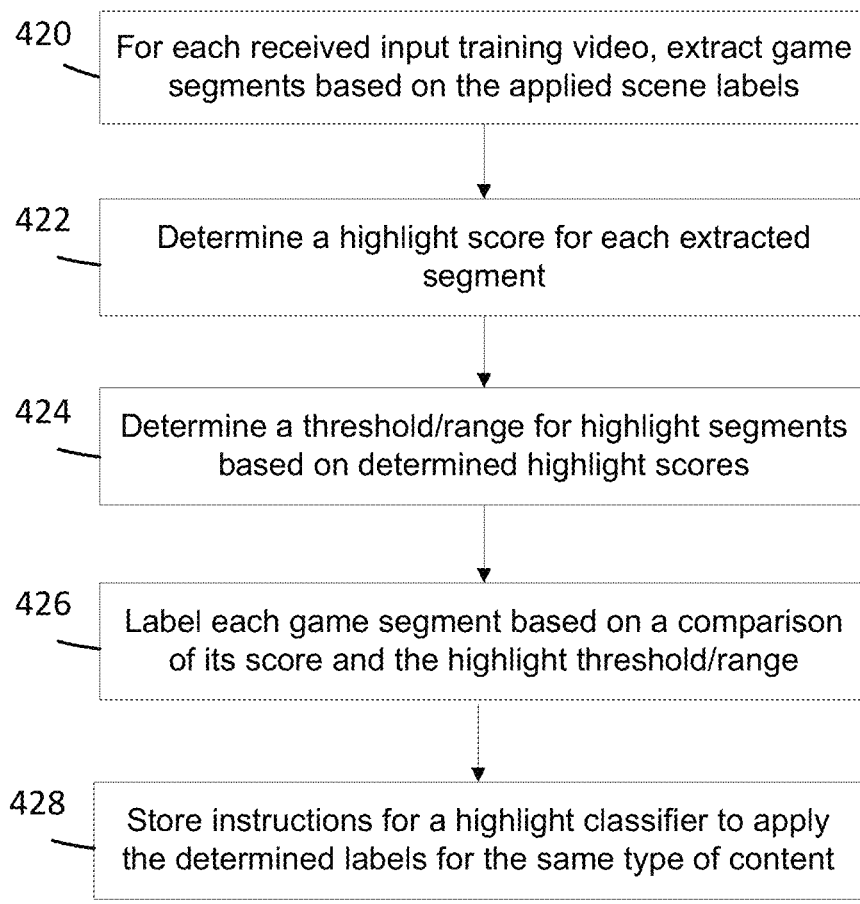

Turning to FIGS. 4A-4B and 5, the disclosed processes provide systems and methods for training a prediction model (e.g., the scene-highlight classifier engine 300) to score highlights from game scenes of streaming media (Process 400 of FIGS. 4A-4B) and implementing the trained model in real-time on live-streaming video in order to identify and/or create highlight video segments from the live stream (Process 500 of FIG. 5).

In FIGS. 4A-4B, Process 400 is disclosed which details steps performed in accordance with exemplary embodiments of the present disclosure for building the cascading modeling technique that the scene-highlight classifier engine 300 will implement upon receiving (e.g., reading) streaming media in real-time. In FIG. 4A, Steps 402-418 of Process 400 are disclosed, which are performed by the scene learning module 302, while in FIG. 4B, Steps 420-428 of Process 400 are disclosed, which are performed by the highlight learning module 304.

As discussed herein, the learned cascading modeling implemented by the scene-highlight classifier engine 300 enables live-streaming videos to be analyzed, and as a result, non-game parts from video can be discarded early in the evaluation process, which enables the computational resources of the scene-highlight classifier engine 300 to be focused on detecting highlights from game-only scenes. This architectural set up and implementation of the scene-highlight classifier engine 300 enables efficient, real-time processing of video in a streaming environment.

In order to train the cascaded prediction model implemented by the scene-highlight classifier engine 300, training data for two layers of predictions is to be developed: one dataset with scene type labels and another one with highlight labels for scenes labeled for game-play. As discussed herein, building the dataset for the scene type labels facilitates the creation of the dataset for the highlight labels.

In some embodiments, as discussed herein, the trained/learned scene-highlight classifier engine 300 applies bootstrapping methodology that enables recursive annotations of scene types that progressively minimizes human intervention after each iteration. In some embodiments, the iterations can be performed up to the point where annotators only need to check that the annotations are correct and possibly perform minor adjustments. Once the scene type dataset is ready, the "game" sections that have been identified are extracted and delivered to the annotators to create the highlight dataset. In this regard, annotators review the game video segments/scenes and determine which segments are highlights. In some embodiments, the annotators input/feedback as to whether the scenes are highlights can be provided by the annotator pressing an arrow (e.g., up for "yes, a highlight" or down for "no, not a highlight") while they watch the game scene, without needing to label scene types.

Process 400 begins with Step 402 where a first set of input training videos are received. The set of input training videos can include a single video or a plurality of videos. Each training video comprises training frames. For example, given a set of 100 training videos, Step 402 can involve 20 of those 100 training videos (e.g., videos 1-20) being provided to the scene learning module 302.

In Step 404, each received training video from Step 402 is analyzed and a set of training frames within each video is identified. In some embodiments, only a particular set of frames from within each received video is identified, and in some embodiments, the set of training frames includes all the frames of the received videos.

In Step 406, a label for each of the identified set of frames is determined. In some embodiments, such label can be determined by a human editor (referred to as an annotator). In some embodiments, an annotator will review the set of frames identified in Step 404, and based on the content depicted by each frame, a label can be assigned to that set of frames. The determined/applied label provides an indication as to the type of content depicted within the set of frames. For example, if the set of frames depicts game play, then the label will indicate that the scene depicted by the set of frames is a "game"—a game label.

In Step 408, a set of instructions is compiled based on the applied label. The set of instructions is stored in connection with the scene classifier (in database 320) such that when the scene classifier analyzes similar type of content as the content of the frames from Steps 404-406, the scene classifier can apply the same label.

Now, having an initial set of instructions stored in connection with the scene classifier, the scene classifier is viewed as having been trained (at least for an initial iteration). Therefore, in Step 410, another set of videos are received. As above, the video set received in Step 410 can include, for example, another set of 20 unlabeled videos (e.g., videos 21-40).

In Step 412, the now trained scene classifier is applied to the new set of videos which results in the automatic determination of labels for the frames of the new videos.

In Step 414, the automatically applied scene labels from Step 412 are reviewed and corrected if necessary. In some embodiments, Step 414 can be performed by an annotator. For example, if a label is placed in the wrong spot along the sequence of frames of a video, or incorrectly labeled (e.g., labeled as game play when the commentator is speaking), then the annotator can adjust/modify the label accordingly. In some embodiments, since a label is already applied automatically and the annotator here is only reviewing the annotations accuracy, the playback of the video scene being reviewed can be increased (e.g., 2×, for example) since the correct labels may have already been applied (a probability that increases the more iterations of Step 410-416 are performed, as discussed below).

In Step 416, a new set of instructions is compiled based on the review/analysis of the annotator from Step 414. Similar to Step 408, these instructions are stored in connection with the scene classifier and are to be applied to subsequently received video(s). In some embodiments, the storage of instructions comprises updating the previously stored instructions with the result of Step 414.

Steps 410-416 are performed recursively until the automatic label application and review process of Steps 412-414 satisfies an accuracy threshold. Therefore, Step 414 further involves comparing the edits/modifications of the automatically applied labels made by the annotator to an accuracy threshold, and should the comparison reveal accuracy below the accuracy threshold, Steps 410-416 are performed again. For example, if the annotator corrects the automatically learned and applied scene labels a predetermined number of times, then that fails the accuracy threshold and another set of videos must be analyzed in order to further train the scene classifier with refined instructions (e.g., Step 416). However, if the accuracy is at or above the accuracy threshold, then Process 400 proceeds to Step 420.

In Step 420, segments labeled with the "game" label from the training videos are extracted. Such extraction can be performed by any known or to be known extraction algorithm that enables the extraction of a portion of a video file to be extracted based on an applied label.

In Step 422, a highlight score each extracted game segment is determined. In some embodiments, the highlight scores can be determined by an annotator. In some embodiments, the annotator performing the highlight score annotator is a different annotator than the scene annotator discussed above, and in some embodiments, they can be the same annotator.

For example, if a game segment is depicting highlight quality content (as discussed above) at or above the highlight threshold, then the annotator can score the game segment a "1." If the game segment does not depict a highlight, then the annotator can score the game segment a "0." In another example, a highlight annotator may score game segments on a scale from 0 to 100, where scores over 75 depict a highlight.

As such, in some embodiments, based on the scores applied by the highlight annotators in Step 422, a highlight threshold/range can be determined. For example, if the annotator scores videos on the scale of 0 to 1, as above, then a highlight range can be established for determining whether other game segments are highlights based on the whether they score a "0" or "1." In another example, from the above example of scoring game segments from 0 to 100, the score of 75 can be set as a highlight threshold, such that any game segment scored at or above 75 is labeled a highlight.

In Step 426, each extracted game segment is then scored in relation to the established highlight threshold/range, and based on such scoring, as in Step 428, instructions are stored in connection the highlight classifier. In a similar manner as discussed above in relation to Steps 408 and 416, the stored instructions for the highlight classifier enable future game segments to be labeled as a highlight or not, as discussed in more detail in relation to Process 500 of FIG. 5.

Turning to FIG. 5, Processes 500 details steps performed in accordance with exemplary embodiments of the present disclosure for, in a fully automated manner, detecting and rendering highlight video segments of streaming game videos in real-time. Steps 502-508 are performed by the scene classifier module 306, which is trained based on the stored scene instructions from Process 400, as discussed above. Steps 510-514 are performed by the highlight classifier module 308, which is trained based on the stored highlight instructions from Process 400, as discussed above. Steps 516-518 are performed by the generation module 310.

Process 500 begins with Step 502 where a new streaming video is received. As discussed above, the streaming video can be, for example, associated with a live broadcast of a game. Thus, Step 502 can involve, for example, a user visiting a webpage or opening an application to view a streaming event provided by Yahoo! eSports®. It should be understood that the content of the streaming video can be associated with any type of content, and the functionality of the instant application will remain applicable.

Step 502's reception of a live-streamed video broadcast includes reading (or storing) the received video frames into memory (e.g., database 320) as each frame of the video is received. In a streaming media environment, a video is delivered as a continuous stream of short video segments (e.g., 8 seconds). According to some embodiments, Step 502's reception of the video stream involves sub-sampling the frames at a predetermined frame rate—for example, 5 frames per second. Therefore, for example, with an 8 second-long video segment there are only 40 frames to process.

In Step 504, a set of frames of the received streaming video are automatically analyzed in order to determine a scene type for the frames. Step 504's analysis of the frames involves accessing the stored frames of the streaming video sequentially. In some embodiments, the set of frames can include one frame at a time, a sub-set or predetermined sequence of frames within the entirety of the streaming video's frames (a portion of the stream's frames), or all of the frames of the streaming video.

Thus, in some embodiments, the frames can be read from memory either one frame at a time, and in some embodiments, the frames can be read in accordance with a predetermined short sequence of frames. In the embodiments where the frames are read one at a time, scene types can be determined based solely on the spatial layout of each frame (e.g., the order of the frames, as illustrated, for example, in FIG. 6). In embodiments where a set sequence of frames is read, scene types are determined based on the spatial layout of the video stream and the temporal layout of the video stream. In some embodiments, reading a set sequence of frames can lead to increased performance over analysis via a frame-by-frame analysis; however, an increased computational footprint may be realized. In either case, the reading of the frame set acts as the input for the scene classifier module 306, as discussed herein.

In some embodiments, the scene classifier module 306 can implement image recognition software to determine (or predict) a scene type. According to some embodiments, the image recognition software implemented by the scene classifier module 306 can involve any known or to be known deep learning architecture or algorithm, such as, but not limited to, deep neural networks, artificial neural networks (ANNs), convolutional neural networks (CNNs), deep belief networks and the like. According to some embodiments, the scene classifier module 302 employs CNNs (however, it should not be construed to limit the present disclosure to only the usage of CNNs, as any known or to be known deep learning architecture or algorithm is applicable to the disclosed systems and methods discussed herein). CNNs consist of multiple layers which can include: the convolutional layer, ReLU (rectified linear unit) layer, pooling layer, dropout layer and loss layer, as understood by those of skill in the art. When used for image recognition, CNNs produce multiple tiers of deep feature collections by analyzing small portions of an input image.

For purposes of this disclosure, such features/descriptors can include, but are not limited to, visual characteristics of the images characterized (or categorized and labeled) by color features, texture features, type features, edge features and/or shape features, and the like. The results of these collections are then tiled so that they overlap to obtain a better representation of the original image; which is repeated for every CNN layer. CNNs may include local or global pooling layers, which combine the outputs of feature clusters. One advantage of CNNs is the use of shared weight in convolutional layers; that is, the same filter (weights) is used for each pixel in each layer, thereby reducing required memory size and improving performance. Compared to other image classification algorithms, CNNs use relatively little pre-processing which avoids the dependence on prior-knowledge and the existence of difficult to design hand-crafted features.

Indeed, it should be understood by those of skill in the art that the features/attributes (or descriptors or deep descriptors) of the video stream can include any type of information contained in, or associated therewith, image data, video data, audio data, multimedia data, metadata, or any other known or to be known content that can be associated with, derived from or comprised within the streaming video file. For example, in some embodiments, such feature data can be audio data associated with an image frame of the video stream that plays when the video is viewed.

Thus, in light of the above discussion, Step 504's analysis of the frame set of the streaming video via image recognition software, using CNN for image classification, involves the scene classifier module 306 performing a series of transformations to a frame's image in order to return a categorical label as an output. Such transformations can include, but are not limited to, numerical transformations of a 2D convolution for an image (or single frame), 3D convolution for a sequence of images (or set sequence of frames), average/max pooling over local regions in space and time, local response normalization, and the like. As discussed above, implementation of a CNN image classification embodiment involves multiple layers that represent an input at an increasing level of abstraction in a fine-to-coarse manner. For example, a low-level layer can represent an input image (from a frame) as activations to several 3×3 edge filters, while a high-level filter may represent the input image as activations to several 32×32 object-like shape filters. The CNN classification can then include a last layer that produces a categorical label. Such layer can include any type of classification technique or algorithm, such as, for example, a softmax function followed by an argmax operation.

Therefore, as a result of the analysis performed in Step 504, as detailed above, a label can be applied to each scene of the streaming video. Step 506. As discussed above, for example, such labels can involve categorizing scenes as, for example, "game," "game play," "game character selection," "game statistics," "game player," "commentator," "audience," "game statistics," and the like, or any other type of categorical summarization of a scene within a game's video stream. As discussed above, such scene label types can be initially determined from the scene learning module 302 and are applied by the scene classifier module 306.

In some embodiments, once the scene labels for the video segments of the streaming video are determined, the scene classifier module 306 may execute temporal smoothing software in order to reduce noise of the scene type results. Such temporal smoothing software can involve performing any type of known or to be known temporal smoothing technique or algorithm including, but not limited to, additive smoothing, convolution, curve fitting, edge preserving smoothing, exponential smoothing, and the like, to name a few examples.

In Step 508, a determination is made regarding whether the labeled scenes are "game" scenes. That is, once the labels are applied to a scene or scenes of a streaming video, it is determined whether the scene depicts game play or other type of scenes that appear in the video stream (e.g., scenes depicting commentator, the audience, game statistics, or any other type of scene from a game that is not directly showing game play or activity).

If the scene is a "game" scene—it is labeled as a "game" scene from Step 506—then, Process 500 proceeds to Step 510 where a score for the game scene is determined.

In Step 510, in some embodiments, only game scenes are scored because the scene-highlight classifier engine 300 is implemented to determine "highlights" of game play scenes. In some embodiments, the scoring of the game scenes is performed by the highlight classifier module 308 implementing any known or to be known image recognition model in order to determine a highlight score.

In a similar manner as discussed above, the frames of the scene that are labeled as "game" scenes are read from memory either in a frame-by-frame basis or as a set sequence of frames (see Step 504 above). Similar to Step 506, in some embodiments, the highlight classifier module 308 implements a CNN image classification model to analyze the contents of the game scene (e.g., frame or frames of the scene); however, the difference between Step 506 and Step 510 analysis is that the last layer of the CNN model produces a real-valued scalar range that represents a highlight score (as opposed to a label). In some embodiments, for example, Step 510 can involve the softmax function of the last layer being followed by a max operation (as opposed to an argmax operation). In some embodiments, in another example, the last layer of the CNN model implemented by the highlight classifier module 308 can implement a regression-type function using any known or to be known regression or regression-type technique or algorithm to produce a score for content of a game scene. In some embodiments, the scalar range (or threshold) can be initially determined by the highlight learning module 304 and applied by the highlight classifier module 308, as discussed above.

In Step 512, once the scores are determined, they are compared against the scalar range/threshold in order to determine if the game scene is a highlight. In Step 514, if the game scene's score falls within the scalar range (e.g., [0, 1]), or satisfies the highlight threshold, then the scene is labeled as a "highlight." Process 500 then proceeds to Step 516.

In some embodiments, once the highlight labels for the video segments of the streaming video labeled as game scenes are determined, the highlight classifier module 308 may execute temporal smoothing software in order to reduce noise, in a similar manner as discussed above.

Turning back to Step 508, if the game scene is determined to be another type of scene—i.e., not a "game" scene—a highlight score of zero is assigned to such scene and Process 500 proceeds to Step 516.

In Step 516, an output file is generated (or created) and stored in memory (e.g., database 320). The generated output file for the streaming video comprises time-stamped information associated with the determined and assigned scene labels and highlight labels. Such information can include, but is not limited to, a frame index, scene type label, scene label accuracy (or confidence), highlight score, and the like.

By way of a non-limiting example of Steps 502-516, using the video stream 600 from FIG. 6 as discussed above, an output file for stream 600 is generated that comprises the following information, as illustrated in the below table:

| Frame Index | Scene Type | Highlight Score |
| --- | --- | --- |
| 1-3 | Commentator | 0 |
| 4 | Transition | 0 |
| 5-7 | Game | 1 |
| 8 | Transition | 0 |

It should be understood that such table is a non-limiting example of a generated output file for stream 600, and should not be construed as limiting the scope of the output file or information that can be stored in the output file.

In Step 518, the game segments labeled as highlight game segments (e.g., frames 5-7 of stream 600 from the above example) can be transformed into their own independent short-form files. For example, the generation module 310 can create an animated GIF from a highlight game segment using any known or to be known frame/segment transformation technique, such as, but not limited to, imagemagick and gifsicle libraries, to name a few examples. Generation of a short-form video, as discussed herein, can include extracting the frames from memory, copying the frames from memory and/or creating new frames based on the content of the stored frames, and the like.

In some embodiments, after the short-form generation of the highlight video segment is performed, the generated video file can be communicated to a user for display on a user's device. In some embodiments, such communication can involve automatically rendering the highlight video segment upon display on the user's device, which is ideal for a user that has requested the highlight video segment. In some embodiments, such communication can involve a user sharing the highlight video segment with another user. In some embodiments, sharing of the highlight video segment with an identified set of users can be performed automatically upon generation of the highlight video segment, where not only does the requesting user receive the highlight video segment, but also other users who follow the user, or have been identified by the user, can be provided the generated highlight video segment (e.g., reblogging the highlight video segment to a user's followers pages on Tumblr®). As will be understood by those of skill in the art, sharing highlight video segment extracted from streaming video in this manner could result in improved user engagement in video content from which the highlight video segment was created, as well as increased activity by users on the site/platform (e.g., Yahoo! eSports®) associated with the streaming video/highlight video segment.

According to some embodiments of the present disclosure, information associated with a extracted/created highlight video segment, as discussed above in relation to Process 500 (and/or Process 400), can be fed back to the scene-highlight classifier engine 300 for modeling (or training) of the information stored in database 320 via iterative or recursive bootstrapping or aggregation functionality. This can improve the accuracy of scores for highlight video segments, as discussed above. Embodiments of the present disclosure involve the scene-highlight classifier engine 300 applying such recursive/bootstrapping functions utilizing any known or to be known open source and/or commercial software machine learning algorithm, technique or technology.

FIG. 7 is a work flow example 700 for serving relevant digital content comprising advertisements (e.g., advertisement content) based on the information associated with an identified and/or created highlight video segment, as discussed above in relation to FIGS. 3-5. Such information, referred to as "highlight video segment information" for reference purposes only, can include, but is not limited to, the identity of the video segment within the streaming media (e.g., frames and labels), the attributes of the video segment, the content of the video segment, and the like, and/or some combination thereof.

As discussed herein, reference to an "advertisement" should be understood to include, but not be limited to, digital content that provides information provided by another user, service, third party, entity, and the like. Such digital ad content can include any type of media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities.

By way of a non-limiting example, work flow 700 includes a user being provided with a highlight video segment from a recent contest of StarCraft on the Yahoo! eSports® platform, as discussed above. Based on information related to the determination that the highlight video segment is derived from the StarCraft game, for example, the user may be provided with digital ad content related to the purchase of accessories from playing the StarCraft game. In another example, the digital ad content can be related to coupons for locations that sell StarCraft or other like games. In yet another non-limiting example, the digital ad content can be related to promotions provided by Yahoo! ® for the user to set up or upgrade his/her account status within the eSports® platform.

In Step 702, highlight video segment information associated with a created highlight video segment file is identified. As discussed above, the highlight video segment information can be based on the highlight video segment creation process outlined above with respect to FIGS. 3-5. For purposes of this disclosure, Process 700 will refer to single highlight video segment file as the basis for serving an advertisement(s); however, it should not be construed as limiting, as any number of highlight video segments, and/or quantities of information related to users and their interaction with created highlight video segments or streaming media can form such basis, without departing from the scope of the instant disclosure.

In Step 704, a context is determined based on the identified highlight video segment information. This context forms a basis for serving advertisements related to the highlight video segment information. In some embodiments, the context can be determined by determining a category which the highlight video segment information of Step 702 represents. For example, the category can be related to the type of streaming video from which the highlight video segment was created, and/or can be related to the content type of the highlight video segment file. In some embodiments, the identification of the context from Step 704 can occur before, during and/or after the analysis detailed above with respect to Processes 400-500, or some combination thereof.

In Step 706, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 708, the advertisement server 130 searches the ad database for an advertisement(s) that matches the identified context. In Step 710, an advertisement is selected (or retrieved) based on the results of Step 708. In some embodiments, the selected advertisement can be modified to conform to attributes of the page, message or method upon which the advertisement will be displayed, and/or to the application and/or device for which it will be displayed. In some embodiments, the selected advertisement is shared or communicated via the application the user is utilizing to render the highlight video segment. Step 712. In some embodiments, the selected advertisement is sent directly to each user's computing device. In some embodiments, the selected advertisement is displayed in conjunction with a displayed highlight video segment on the user's device and/or within the application being used to identify, select and/or render the highlight video segment file.

As shown in FIG. 8, internal architecture 800 of a computing device(s), computing system, computing platform, user devices, set-top box, smart TV and the like includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), media disk drive interface 820 as an interface for a drive that can read and/or write to media including removable media such as floppy, CD-ROM, DVD, media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 828 typically provides information communication using transmission media through one or more networks to other devices that use or process the information. For example, network link 828 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server host 834 connected to the Internet 832 hosts a process that provides a service in response to information received over the Internet 832. For example, server host 834 hosts a process that provides information representing video data for presentation at display 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 802 as it is received, or may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising steps of:
    receiving, at a computing device, a video stream comprising a plurality of frames of content;
    determining, via the computing device, labels for the plurality of frames based on attributes of the plurality of frames, each label comprising an indication of a scene type depicted in content of a respective frame;
    storing, via the computing device, the labels as training data for first image recognition software;
    training, by the computing device, the first image recognition software using the training data;
    applying, via the computing device, the first image recognition software to a set of training videos, the first image recognition software generating second labels for the training videos;
    identifying, via the computing device, an inaccurate label in the second labels;
    updating, via the computing device, the indication associated with the inaccurate label;
    updating, via the computing device, the training data with the updated label; and
    re-training, via the computing device, the first image recognition using the training data.

2. The method of claim 1, wherein when said inaccurate label fails to satisfy an accuracy threshold, repeating said steps until said inaccurate label satisfies the accuracy threshold.

3. The method of claim 1, wherein when said accuracy satisfies said accuracy threshold, the method further comprises:

determining a highlight score for each scene of the training videos labeled a game scene;
labeling each game scene a highlight based on said highlight score; and
storing said labeled game scenes in said database for use by second image recognition software, wherein said labeled game scenes are associated with said predetermined set of machine-learned highlight attributes.

4. The method of claim 1, wherein the analysis of the plurality of frames is based on a spatial layout of the received frames of the video stream.

5. The method of claim 1, wherein said analysis of the plurality of frames is based on a spatial layout of the received frames and a temporal layout of the received frames.

6. The method of claim 1, wherein said transformations performed by the first image recognition software comprise convolutional neural network (CNN) image classification, wherein said CNN image classification comprises a last layer having a softmax function and an argmax operation.

7. The method of claim 1, further comprising:
determining, via the computing device, a type of scene depicted in a new frame set, the determining comprising applying the first image recognition software to frames of the new frame set to assign a scene label to said new frame set;
determining, via the computing device, that said scene type is a game scene based on the assigned label, said game scene comprising content associated with game play occurring in a live event;
determining, via the computing device, that said content within said game scene is a highlight and designating said game scene as a highlight, said determination comprising computing a highlight score for said game scene by analyzing frames of the game scene via second image recognition software and determining that an output from said second image recognition software satisfies a threshold, said output based on a comparison of the attributes of the frame content in the game scene against a predetermined set of machine-learned highlight attributes;
generating, via the computing device, an output file corresponding to the video stream, said output file comprising time-stamped information associated with the scene label and the highlight label; and
automatically creating, via the computing device, a highlight video segment from the video stream based on said output file, said highlight video segment created from and comprising frames of the video stream identified in the output file as the game scene and highlight.

8. The method of claim 1, further comprising:
storing each received frame of the video stream in memory as it is received; and
identifying said plurality of frames from said stored received frames.

9. The method of claim 7, further comprising:
determining a context of the highlight video segment;
causing communication, over the network, of said context to an advertisement platform to obtain digital advertisement content associated with said context; and
communicating a digital content object comprising said identified digital advertisement content with said highlight video segment to a user.

10. A non-transitory computer-readable storage medium tangibly encoded with computer-executable instructions, that when executed by a processor associated with a computing device, performs a method comprising:
receiving a video stream comprising a plurality of frames of content;
determining labels for the plurality of frames based on attributes of the plurality of frames, each label comprising an indication of a scene type depicted in content of a respective frame;
storing the labels as training data for first image recognition software;
training the first image recognition software using the training data;
applying the first image recognition software to a set of training videos, the first image recognition software generating second labels for the training videos;
identifying an inaccurate label in the second labels;
updating the indication associated with the inaccurate label;
updating the training data with the updated label; and
re-training the first image recognition using the training data.

11. The non-transitory computer-readable storage medium of claim 10, the method further comprising:
determining an accuracy of said automatically applied labels;
when said accuracy fails to satisfy an accuracy threshold, re-adjusting labels identified as inaccurate until said accuracy satisfies the accuracy threshold, and
when said accuracy satisfies said accuracy threshold:
determining a highlight score for each scene of the training videos labeled a game scene;
labeling each game scene a highlight based on said highlight score; and
storing said labeled game scenes in said database for use by second image recognition software.

12. The non-transitory computer-readable storage medium of claim 10, further comprising:
storing each received frame of the video stream in memory as it is received; and
identifying said plurality of frames from said stored received frames.

13. A computing device comprising:
a processor;
a non-transitory computer-readable storage medium for tangibly storing thereon program logic for execution by the processor, the program logic comprising:
logic executed by the processor for receiving, at a computing device, a video stream comprising a plurality of frames of content;
logic, executed by the processor, for determining labels for the plurality of frames based on attributes of the plurality of frames, each label comprising an indication of a scene type depicted in content of a respective frame;
logic, executed by the processor, for storing the labels as training data for first image recognition software;
logic, executed by the processor, for training the first image recognition software using the training data;
logic, executed by the processor, for applying the first image recognition software to a set of training videos, the first image recognition software generating second labels for the training videos;
logic, executed by the processor, for identifying an inaccurate label in the second labels;
logic, executed by the processor, for updating the indication associated with the inaccurate label; and
logic, executed by the processor, for updating the training data with the updated label; and logic, executed by the processor, for re-training the first image recognition using the training data.

14. The method of claim 7, wherein the second image recognition software comprises convolutional neural network (CNN) image classification, wherein said CNN image classification comprises a last layer comprising functionality selected from a group consisting of: a softmax function and max operation, and a regression-type function.

15. The method of claim 7, further comprising:
communicating, over the network, said highlight video segment to a user, said communication occurring automatically upon creation of said highlight video segment;
determining that said type of scene is a scene type different from said game scene;
assigning said frame set a highlight score of zero indicting that the scene is not a highlight; and
storing information associated with said different scene type and zero highlight score in said output file.

16. The method of claim 7, the first image recognition software comprising a deep learning algorithm comprising multiple layers, each layer producing a feature collection for a given frame, the deep learning algorithm comprising overlapping, for each frame, the feature collections associated with each layer, pooling the overlapping feature collections, and assigning a label to the frame set based on the pooled feature collections.

17. The non-transitory computer-readable storage medium of claim 10, the method further comprising:
determining, via the computing device, a type of scene depicted in a new frame set, the determining comprising applying the first image recognition software to frames of the new frame set to assign a scene label to said new frame set;
determining, via the computing device, that said scene type is a game scene based on the assigned label, said game scene comprising content associated with game play occurring in a live event;
determining, via the computing device, that said content within said game scene is a highlight and designating said game scene as a highlight, said determination comprising computing a highlight score for said game scene by analyzing frames of the game scene via second image recognition software and determining that an output from said second image recognition software satisfies a threshold, said output based on a comparison of the attributes of the frame content in the game scene against a predetermined set of machine-learned highlight attributes;
generating, via the computing device, an output file corresponding to the video stream, said output file comprising time-stamped information associated with the scene label and the highlight label; and
automatically creating, via the computing device, a highlight video segment from the video stream based on said output file, said highlight video segment created from and comprising frames of the video stream identified in the output file as the game scene and highlight.

18. The non-transitory computer-readable storage medium of claim 17, the method further comprising:
communicating, over the network, said highlight video segment to a user, said communication occurring automatically upon creation of said highlight video segment;
determining that said type of scene is a scene type different from said game scene;
assigning said frame set a highlight score of zero indicting that the scene is not a highlight; and
storing information associated with said different scene type and zero highlight score in said output file.

19. The non-transitory computer-readable storage medium of claim 17, the first image recognition software comprising a deep learning algorithm comprising multiple layers, each layer producing a feature collection for a given frame, the deep learning algorithm comprising overlapping, for each frame, the feature collections associated with each layer, pooling the overlapping feature collections, and assigning a label to the frame set based on the pooled feature collections.

* * * * *